United States Patent [19]

Ozawa et al.

[11] Patent Number: 4,875,741
[45] Date of Patent: Oct. 24, 1989

[54] ANTI-SKID BRAKING CONTROL SYSTEM FOR USE ON MOTOR VEHICLE

[75] Inventors: Takashi Ozawa, Gifu; Hitoshi Tanaka, Oobu; Takahiro Goshima, Gifu; Kozi Takagi, Takahama, all of Japan

[73] Assignee: Nippondenso Co., Ltd., Kariya, Japan

[21] Appl. No.: 304,595

[22] Filed: Feb. 1, 1989

[30] Foreign Application Priority Data

Feb. 2, 1988 [JP] Japan .................................. 63-23304

[51] Int. Cl.$^4$ ............................................. B60T 8/40
[52] U.S. Cl. .................................... 303/116; 303/111
[58] Field of Search ................. 303/61, 111, 113, 115, 303/116, 119

[56] References Cited

U.S. PATENT DOCUMENTS

| | | | |
|---|---|---|---|
| 4,099,793 | 7/1978 | Iio | 303/116 |
| 4,536,041 | 8/1985 | Kosolapov et al. | 303/119 |
| 4,726,630 | 2/1988 | Krohn et al. | 303/119 |
| 4,755,007 | 7/1988 | Mollat | 303/61 |
| 4,804,236 | 2/1989 | Burgdorf et al. | 303/116 |

FOREIGN PATENT DOCUMENTS

58-50903 11/1983 Japan .
60-25833 2/1985 Japan .

*Primary Examiner*—Duane A. Reger
*Attorney, Agent, or Firm*—Cushman, Darby & Cushman

[57] ABSTRACT

An anti-skid braking control system for use on a motor vehicle having first and second wheels includes first and second wheel cylinders for braking the first and second wheels, respectively, with a braking medium pressure transmitted from a master cylinder, first and second solenoid-operated valves disposed in pipes interconnecting the master cylinder and the first and second wheel cylinders, respectively, for selectively providing communication between the master cylinder and the first and second wheel cylinders through the pipes, and first and second pumps connected to the pipes, respectively, for delivering a braking medium from portions of the pipes downstream of the valves to portions of the pipes upstream of the valves. The first and second pumps comprise a common housing, a common plunger slidably disposed in the common housing and reciprocally movable therein, and first and second pressure varying chambers defined by the plunger independently of each other and having respective volumes variable in response to reciprocating movement of the common plunger, the first and second pressure varying chambers having inlet ports, respectively, connected directly to the downstream portions of the pipes. When the anti-skid braking control system operates in an anti-skid braking control mode, the common plunger is reciprocally moved to enable the first and the second pumps to reduce the braking medium pressures in the first and second wheel cylinders independently of each other.

12 Claims, 6 Drawing Sheets

ANTI-SKID BRAKING CONTROL SYSTEM FOR USE ON MOTOR VEHICLE

BACKGROUND OF THE INVENTION

1. Field of the Invention

The present invention relates to an anti-skid braking control system for preventing wheel lockup during abrupt braking to achieve stable braking, improve steering control, and reduce stopping distances, and more particularly to an anti-skid braking control system of a simple construction which is capable of controlling a plurality of wheel brake cylinder pressures independently of each other.

2. Description of the Prior Art

Japanese Patent Publication No. 58-50903 discloses an anti-skid braking system for use on a motorcycle. The disclosed anti-skid braking system is structurally simpler than a four-wheel anti-skid braking system in that it has no reservoir.

If the conventional anti-skid braking system which has no reservoir is incorporated in a four-wheel automobile, then various problems will be caused as described below. In order to control four wheel brake cylinder pressures independently of each other, a total of four fluid pressure pumps each for one wheel brake cylinder are required, but their combined size is large. The entire pump assembly can be reduced in size by controlling two wheel brake cylinders with braking fluid pressures supplied from a single common fluid pressure pump. However, in the event that there is a difference between the two wheel brake cylinder pressures, another problem tends to arise. More specifically, when the braking fluid pressures in two wheel brake cylinders differ from each other, only the higher braking pressure is reduced by the pump, but the lower braking pressure is not lowered since no braking fluid flows from the wheel brake cylinder containing the lower braking pressure into the inlet port of the pump. Stated otherwise, if the braking pressures in the two wheel brake cylinders are reduced by the common pump, there is an instance in which the braking pressures for the two wheels may not be independently controlled.

SUMMARY OF THE INVENTION

It is an object of the present invention to provide an anti-skid braking control system which has a small combined pump size and can control a plurality of wheel brake cylinder pressures independently of each other.

According to the present invention, there is provided an anti-skid braking control system for use on a motor vehicle having first and second wheels, comprising: a master cylinder; first and second wheel cylinders for braking the first and second wheels, respectively, with a braking medium pressure transmitted from the master cylinder; first and second solenoid-operated valves disposed in pipes interconnecting the master cylinder and the first and second wheel cylinders, respectively, for selectively providing communication between the master cylinder and the first and second wheel cylinders through the pipes; first and second pumps connected to the pipes, respectively, for delivering a braking medium from downstream portions of the pipes which are disposed downstream of the first and second solenoid-operated valves with respect to the direction in which the braking medium pressure is transmitted from the master cylinder to the first and second wheel cylinders, to upstream portions of the pipes which are disposed upstream of the first and second solenoid-operated valves with respect to the direction; and the first and second pumps comprising a common housing, a common plunger slidably disposed in the common housing and reciprocally movable therein, and first and second pressure varying chambers defined by the plunger independently of each other and having respective volumes variable in response to reciprocating movement of the common plunger, the first and second pressure varying chambers having inlet ports, respectively, connected directly to the downstream portions of the pipes.

When the anti-skid braking control system operates in an anti-skid braking control mode, the common plunger is reciprocally moved to enable the first and the second pumps to reduce the braking medium pressures in the first and second wheel cylinders independently of each other. The braking medium pressures in the first and second wheel cylinders can independently be regulated by the first and second pumps in coaction with the first and second solenoid-operated valves.

With the arrangement of the anti-skid braking control system, the first and second pumps are connected directly to the first and second wheel cylinders, respectively, without any reservoir connected therebetween. The pressure varying chambers of the first and second pumps are defined by the common plunger independently of each other. The first and second pumps are thus small in size.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
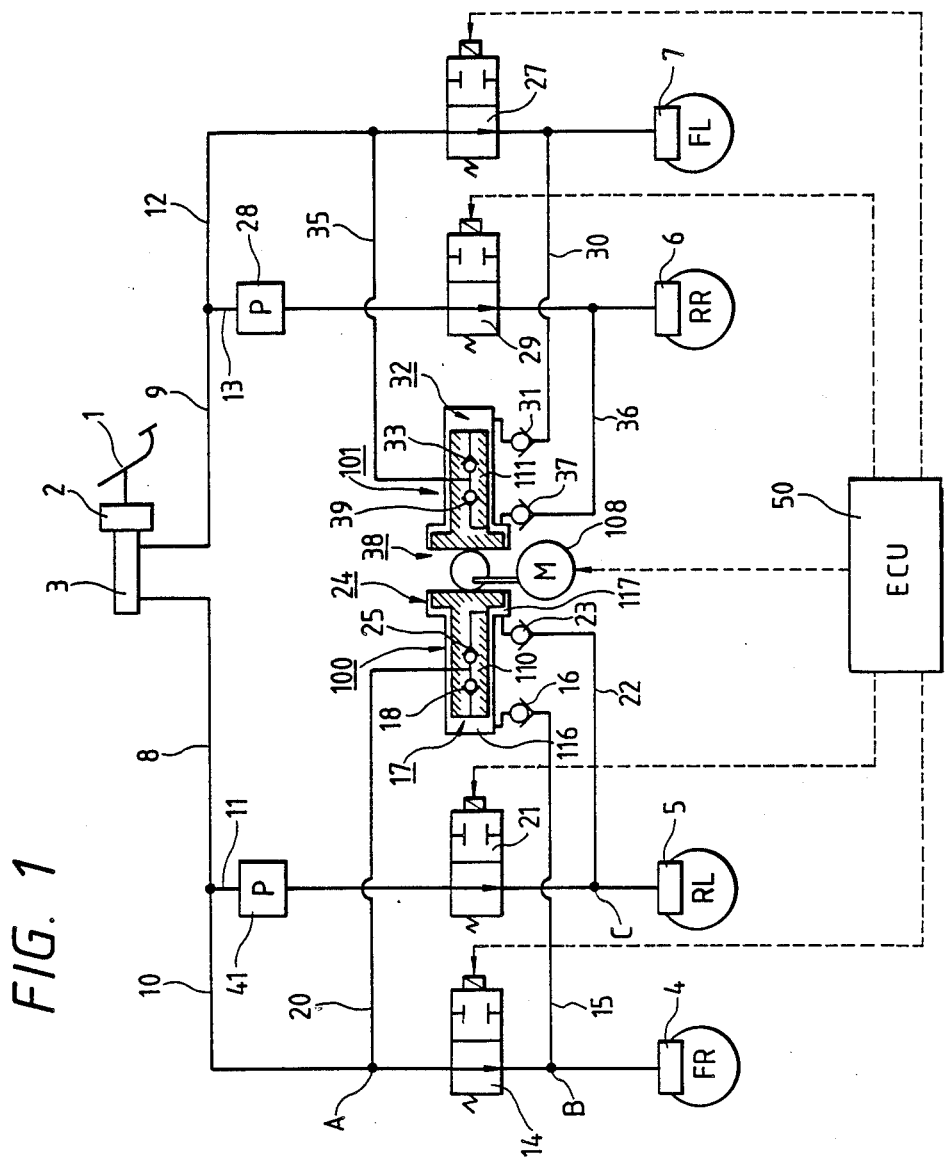
FIG. 1 is a schematic diagram of an anti-skid braking control system according to a first embodiment of the present invention.

An anti-skid braking control system according to a first embodiment of the present invention will hereinafter be described with reference to FIGS. 1 through 3.

The anti-skid braking control system is typically incorporated in a motor vehicle such as an automobile having four road wheels. As shown in FIGS. 1 and 2, a brake pedal 1 of the motor vehicle is operatively coupled to a master cylinder 3 through a vacuum booster 2. For braking the motor vehicle under normal conditions, the brake pedal 1 is depressed to enable the master cylinder 3 to produce a hydraulic pressure which is transmitted through pipes (described later on) to wheel cylinders 4, 5, 6, 7 associated respectively with the front righthand, rear lefthand, rear righthand, and front lefthand road wheels FR, RL, RR, FL. The master cylinder 3 has two pressure chambers (not shown) for discharging braking oil therefrom under the same pressure, the pressure chambers being connected to respective supply pipes 8, 9. The supply pipe 8 is branched into two branch pipes 10, 11, the branch pipe 10 being coupled to the front righthand wheel cylinder 4 and the branch pipe 11 being coupled to the rear lefthand wheel cylinder 5. The supply pipe 9 is branched into two branch pipes 12, 13 which are connected to front lefthand and rear righthand wheel cylinders 7, 6, respectively.

The branch pipe 10 is connected to the wheel cylinder 4 through a two-port two-position solenoid-operated on-off valve 14. The words "upstream" and "downstream" which will be used hereinbelow are defined with respect to the direction in which the hydraulic pressure is applied from the master cylinder 3 to the wheel cylinders 4, 5, 6, 7. The portion of the branch pipe 10 which is positioned downstream of the solenoid-operated valve 14 is further branched off into a pipe 15. The pipe 15 is directly connected to the inlet port of a pump 17 through a check valve 16, the word "directly" meaning that the pipe 15 is connected to the pump 17 without the intermediary of any reservoir. The pump 17 has an outlet port coupled through a check valve 18, a pipe 19 (see FIG. 2), and a pipe 20 directly (i.e., not via any reservoir) to the portion of the pipe 10 which is positioned upstream of the solenoid-operated valve 14. The check valve 18 serves to prevent braking oil from flowing into the pump 17 when the motor vehicle is braked under the normal conditions. The check valve 16 is effective in preventing braking oil from flowing toward the inlet port of the pump 17 when the pump 17 is operated. The operation of the check valve 16 will be described later in more detail in combination with the description of the structure of the pump 17.

The on-off valve 14 is shiftable so that it can selectively take on two positions. When it is in a first position, it provides fluid communication all the way through the branch pipe 10 from the master cylinder 3 to the wheel cylinder 4, and when in a second position, it shuts off the branch pipe 10. Therefore, by depressing the brake pedal 1 when the on-off valve 14 is in the first position, braking oil is supplied from the master cylinder 3 to the wheel cylinder 4.

Likewise, the branch pipe 11 is connected to the wheel cylinder 5 through a two-port two-position solenoid-operated on-off valve 21. The portion of the branch pipe 11 which is positioned downstream of the solenoid-operated valve 21 is further branched off into a pipe 22 that is directly connected to a pump 24 via a check valve 23. The pump 24 has an outlet port coupled through a check valve 25 and a pipe 26 (see FIG. 2) directly to the pipe 20. The check valve 25 serves to prevent braking oil from flowing into the pump 24 when the motor vehicle is braked under the normal conditions. The check valve 23 is effective in preventing braking oil from flowing toward the inlet port of the pump 24 when the pump 24 is operated.

When the on-off valve 21 is in a first position, it provides fluid communication all the way through the branch pipe 11 from the master cylinder 3 to the wheel cylinder 5, and when in a second position, it shuts off the branch pipe 11. Therefore, by depressing the brake pedal 1 when the on-off valve 21 is in the first position, braking oil is supplied from the master cylinder 3 to the wheel cylinder 5. The portion of the branch pipe 11 upstream of the on-off valve 21 has a known proportioning valve 41.

The supply pipe 9 is associated with a hydraulic pressure supply system which is the same as the hydraulic pressure supply system connected to the supply pipe 8 as described above. More specifically, the branch pipe 12 has a two-port two-position solenoid-operated on-off valve 27, and the branch pipe 13 has a proportioning valve 28 and a two-port two-position solenoid-operated valve 29. A pipe 30 connected to the downstream side of the on-off valve 27 is joined to the upstream side of the on-off valve 27 through a check valve 31, a pump 32, a check valve 33, a branch pipe 34 (see FIG. 2), and a branch pipe 35. Similarly, a pipe 36 leading from the downstream side of the on-off valve 29 is coupled to the pipe 35 through a check valve 37, a pump 38, a check valve 39, and a pipe 40 (see FIG. 2). The pumps 17, 28, 32, 38 can be actuated by a motor 108, and the on-off valves 14, 21, 27, 29 and the motor 108 are controlled in operation by an electronic control unit (ECU) 50.

Figure 2:
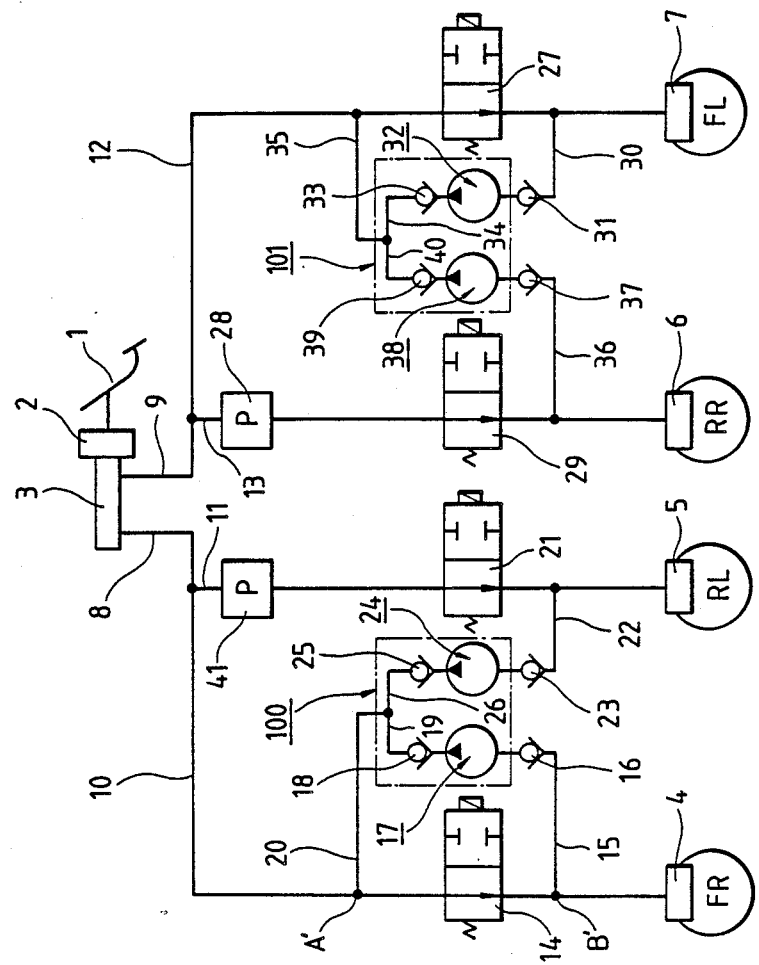
FIG. 2 is a circuit diagram of a hydraulic circuit of the anti-skid braking control system of the first embodiment.
Figure 3:
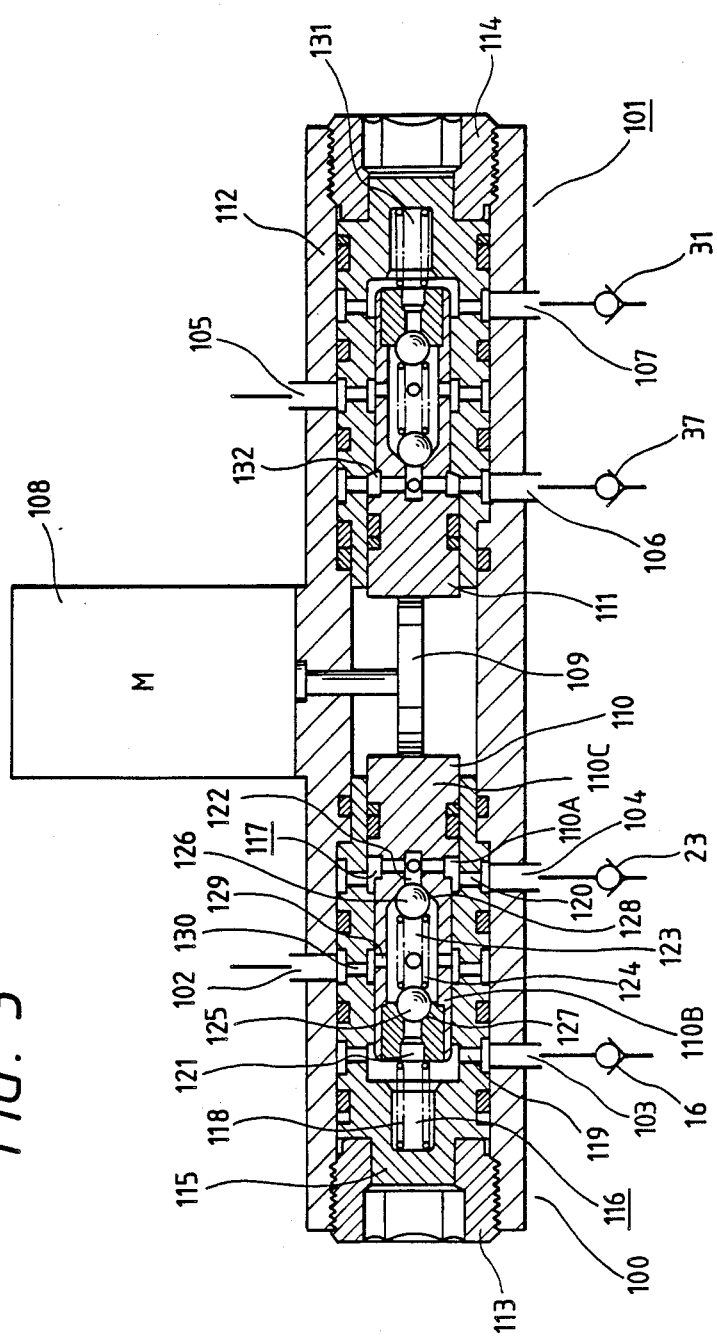
FIG. 3 is an enlarged cross-sectional view of a pump assembly of the anti-skid braking control system of the first embodiment.

FIG. 3 shows in axial cross section a pair of pump assemblies 100, 101. The pump assembly 100 is constructed of the pump 17, the pump 24, the check valve 18, and the check valve 25 (shown in FIG. 2) which are combined together as a unitary arrangement. The pump assembly 101 is similarly of a unitary construction composed of the pump 38, the pump 32, the check valve 39, and the check valve 33 (shown in FIG. 2). The pump assembly 100 has an outlet port 102 communicating with the pipe 20 shown in FIG. 2, and inlet ports 103, 104 communicating with the pipes 15, 22, respectively, through the corresponding check valves 16, 23.

The pump assembly 101 has an outlet port 105 communicating with the pipe 35 shown in FIG. 2, and inlet ports 106, 107 communicating with the pipes 36, 30, respectively, through the corresponding check valves 37, 31. The pump assemblies 100, 101 are identical in structure to each other, and are coaxially disposed in confronting relation to each other in contact with a circular eccentric cam 109 mounted on the shaft of the motor 108 through respective plungers 110, 111. As shown in FIG. 3, the pump assemblies 100, 101 are inserted in a housing 112 at respective end portions thereof, and secured in place by respective screws 113, 114 threaded in the opposite ends of the housing 112.

Since the pump assemblies 100, 101 are of an identical structure, only the pump assembly 100 will be described below. As illustrated in FIG. 3, the pump assembly 100 has a plunger 110 slidably disposed in a cylinder 115 fitted in the housing 112. The plunger 110 has an axial step 110A dividing the plunger 110 into a first (lefthand) smaller-diameter portion 110B and a second (righthand) larger-diameter portion 110C. The cylinder 115 and the first smaller-diameter portion 110B define a first pressure varying chamber 116 therebetween, and the cylinder 115, the first smaller-diameter portion 110B, and the second larger-diameter portion 110C define a second pressure varying chamber 117 therebetween due to the difference between the cross-sectional areas of the first and second portions 110B, 110C. Therefore, the two pressure varying chambers 116, 117 are defined independently of each other by the common plunger 110.

The plunger 110 is normally urged to move in a direction to be held against the eccentric cam 109 by a spring 118 disposed in the first pressure varying chamber 116. The pressure varying chamber 116 is held in communication with the inlet port 103 which is defined in the housing 112 through a passage 119 defined radially in the cylinder 115. The pressure varying chamber 117 communicates with the inlet port 104 which is also defined in the housing 112 through a passage 120 defined radially in the cylinder 115. The two pressure varying chambers 116, 117 are held in communication with passages 121, 122 defined centrally and spaced axially in the plunger 110.

The plunger 110 has an oil chamber 123 defined therein between the passages 121, 122. A common spring 124 is disposed in the oil chamber 123 for normally urging balls 125, 126 on its opposite ends in directions to be pressed against respective conical seats 127, 128 in the plunger 110 for closing the passages 121, 122 which communicate respectively with the pressure varying chambers 116, 117. The seat 127, the ball 125, and the spring 124 jointly serve as th check valve 18 shown in FIGS. 1 and 2, while the seat 128, the ball 126, and the spring 128 jointly serve as the check valve 25 shown in FIGS. 1 and 2. The oil chamber 123 is held in communication with the outlet port 102 through a passage 129 defined in the plunger 110 and a passage 130 defined in the cylinder 115.

Since the righthand end of the plunger 110 is held in contact with the eccentric cam 109, when the motor 108 is energized to rotate the eccentric cam 109, the plunger 110 is reciprocally moved in the axial direction (to the left and right in FIG. 3) due to the eccentric action of the eccentric cam 109 and the forces of the spring 118. Upon such reciprocating movement, the two pressure varying chambers 116, 117 effect a pumping action.

More specifically, when the plunger 110 is moved to the right, the volume of the pressure varying chamber 116 of the pump 17 is increased to start a suction stroke for drawing braking oil from the front wheel cylinder through the check valve 16. When the plunger 110 is moved to the left, the pressure varying chamber 116 starts a discharge stroke for discharging braking oil through the passage 121, the check valve 125, and the oil chamber 123, from which the braking oil is then discharged via the passages 129, 130 and the outlet port 102.

When the plunger 110 is moved to the right, the pressure varying chamber 117 of the pump 24 starts a suction stroke for drawing braking oil from the rear wheel cylinder through the check valve 23. When the plunger 110 is moved to the left, the pressure varying chamber 117 starts a discharge stroke for discharging braking oil through the passage 122 and the check valve 126 into the oil chamber 123 in which the braking oil is combined with the braking oil from the pressure varying chamber 116. Then, the combined braking oil is discharged from the outlet port 102.

The pumps 17, 24 shown in FIG. 2 are operated as described above. The amount of braking oil which is drawn by the pumps 17, 24 is equal to the amount of braking oil which will be removed or discharged from the front wheel cylinder 4 and the rear wheel cylinder 5 when the hydraulic pressures in these wheel cylinders are reduced in an anti-skid braking control mode. Normally, the gradient with which the braking oil pressure should be lowered in the anti-skid braking control mode differs from front wheel cylinder to rear wheel cylinder, and generally the rate of change in the hydraulic pressure with respect to change in the amount of oil in the wheel cylinder also varies from front wheel cylinder to rear wheel cylinder. Therefore, it is necessary for the pumps 17, 24 to have different settings for the amount of oil they should draw. With the arrangement of the present invention, the amounts of oil that can be drawn by the pumps 17, 24, i.e., the variable volumes or displacements of the pressure varying chambers 116, 117 are determined by the axial distance which the plunger 110 traverses, i.e., the stroke of the plunger 110, and the vertical areas of the plunger 110 which face the pressure varying chambers 116, 117, i.e., the cross-sectional areas of the smaller-diameter portion 110B and the larger-diameter portion 110A. Therefore, simply by changing the stepping configuration of the plunger 110, it is possible to vary the ratio of the amounts of oil which can be drawn by the pumps associated with the front and rear wheel cylinder pressure control systems connected to one supply pipe 8 or 9. Hence, the arrangement of the invention preferably allows the amount of oil which can be drawn by the pump combined with the front wheel cylinder to be larger than the amount of oil which can be drawn by the pump combined with the rear wheel cylinder.

Operation of the anti-skid braking control system according to the first embodiment will be described below (I) Normal braking mode:

In FIG. 1, the motor 108 is de-energized, and the on-off valves 14, 21, 29, 27 are inactivated and in the first position as shown, permitting fluid communication therethrough between their upstream and downstream sides. When the brake pedal 1 is depressed, oil discharged under pressure from the master cylinder 3 is directed through the on-off valves 14, 21, 29, 27 to the wheel cylinders 4, 5, 6, 7.

When the brake pedal 1 is released, the oil pressure acting in the wheel cylinder 4 returns to the master cylinder 3 through the branch pipe 10 associated with the on-off valve 14 and also through the pipes 15, 19, 20 combined with the pump 17. The oil pressure acting in the wheel cylinder 5 returns to the master cylinder 3 through the branch pipe 11 associated with the on-off valve 21 and also through the pipes 22, 26, 20 combined with the pump 24.

In the normal braking mode, as described above, the oil pressure generated by the master cylinder 3 is applied to the wheel cylinders to exert braking forces to the respective road wheels.

(II) Anti-skid braking control mode:

If incipient lockup of any one of the four road wheels 4, 5, 6, 7 is sensed by a corresponding one of four wheel speed sensors when the motor vehicle is braked, an anti-skid braking control mode is started. The ECU 50 generates a control signal to operate the pump assemblies 100, 101 continuously and shift the solenoid-operated on-off valve associated with the wheel which has been locked for thereby regulating the hydraulic pressure in the corresponding wheel cylinder to achieve optimum braking of the motor vehicle without wheel lockup.

The various parts of the anti-skid braking control system which is associated with the supply pipe 8 operate as follows: (Since the hydraulic pressure control systems combined with the supply pipes 8, 9 are identical to each other, only the hydraulic pressure control system coupled to the supply pipe 8 will be described below.) The pump 17 draws braking oil from the pipe 15 through the check valve 16, and discharges the introduced braking oil into the pipe 19 (FIG. 2) through the check valve 18, and the pump 24 draws braking oil from the pipe 22 through the check valve 23 and discharges the introduced braking oil into the pipe 26 (FIG. 2) via the check valve 25. The braking oil discharged from the pumps 17, 24 flows through the pipe 20 back into the portion of the branch pipe 10 which is disposed upstream of the on-off valve 14.

When the on-off valves 14, 21 are de-energized, they provide fluid communication therethrough between their upstream and downstream sides. The braking oil which has returned to the upstream side of the on-off valve 14 from the pumps 17, 24 is divided into two flows by a branch point A where the pipe 20 is branched from the branch pipe 10. One oil flow is directed downstream through the on-off valve 14 and the pipe 15 again into the inlet port of the pump 17. The other oil flow flows upstream through the branch pipe 10 into the branch pipe 11 and then flows through the proportional valve 26, the on-off valve 21, and the pipe 22 again into the pump 24 for circulation.

If the ECU 50 determines that the oil pressure in a wheel cylinder should be lowered in order to prevent wheel lockup, the solenoid of the on-off valve 14 or 21 associated with the road wheel which suffers incipient lockup is turned on to shut off the fluid communication between the upstream and downstream sides thereof. For example, if the front righthand wheel FR is locked, the on-off valve 14 is actuated to shut off the fluid communication therethrough. Braking oil in the wheel cylinder 4 flows through the pipe 15 and the check valve 18 into the pump 17, and then through the check valve 18 and the pipes 19, 20 back into the upstream side of the on-off valve 14. The returned braking oil further flows upstream through the branch pipe 10, and is delivered to the master cylinder 3 via the supply pipe 8. The hydraulic pressure in the wheel cylinder 4 is lowered to release the wheel FR from the wheel lockup condition.

Similarly, if the front lefthand hand wheel FL is locked, the on-off valve 21 is actuated to shut off the fluid communication therethrough. Braking oil in the wheel cylinder 5 flows through the pipe 22 and the check valve 23 into the pump 24, and then through the check valve 25 and the pipes 26, 20 back into the upstream side of the on-off valve 14. The returned braking oil further flows upstream through the branch pipe 10, and is delivered to the master cylinder 3 via the supply pipe 8. The hydraulic pressure in the wheel cylinder 5 is lowered to release the wheel FR from the wheel lockup condition.

When the ECU 50 determines that the oil pressure in a wheel cylinder should be raised again after the wheel lockup condition has been removed, the ECU 50 turns off the solenoid of the on-off valve associated with that wheel cylinder to allow fluid communication through the on-off valve. For example, if the oil pressure in the wheel cylinder combined with the front righthand wheel FR is to be increased, the on-off valve 14 is operated into the open position. Now, higher-pressure braking oil flows through the on-off valve 14 into the wheel cylinder 4 to increase its oil pressure for thereby applying braking forces to the front righthand wheel FR.

If the oil pressure in the rear lefthand wheel RL is to be increased, the on-off valve 21 is opened to apply the pressure of braking oil therethrough to the wheel cylinder 5 to generate braking forces to be imposed on the rear lefthand wheel RL.

The oil pressure in the wheel cylinders 4, 5 can be regulated by turning on and off the solenoids of the on-off valves 14, 21 for repeatedly increasing and reducing the braking oil pressure. In the hydraulic pressure supply systems connected to the supply pipe 9, the on-off valves 29, 27 are similarly opened and closed to regulate the oil pressure in the wheel cylinders 6, 7 for increasing and reducing the braking forces. According to the above embodiment, since the braking oil pressures in the wheel cylinders connected to the supply pipe 8 or 9 do not interfere with each other in the anti-skid braking control mode, the braking oil pressures in the wheel cylinders can independently be regulated by controlling the on-off valves 14, 21, 29, 27 separately.

With the above embodiment, the anti-skid braking control system including four two-port two-position on-off valves, two pump assemblies each housed in a common casing, and a common pump can independently increase and reduce the braking oil pressures in the wheel cylinders for precise braking oil pressure.

Since braking oil is circulated between the wheel cylinder and the on-off valve in the anti-skid braking control mode, each on-off valve may be of a simple structure such that its solenoid is only required to be turned on and off. Each pump assembly has a single plunger for varying the displacement of the oil pressure in one of the hydraulic pressure supply pipes 8 and 9 connected to the master cylinder, i.e., in two wheel cylinders. Therefore, the oil pressures in the wheel cylinders associated with four wheels can be controlled by two such pump assemblies, i.e., two plungers therein. The anti-skid braking control system of the present invention is therefore simple in structure and low in cost for independently controling the braking oil pressures for the four wheels.

As shown in FIG. 2, the outlet ports of the two pumps 17, 24 are connected to one pipe 20 which is coupled to the front wheel braking system. This arrangement increases the durability of the entire anti-skid braking control system of the invention.

Figure 4:
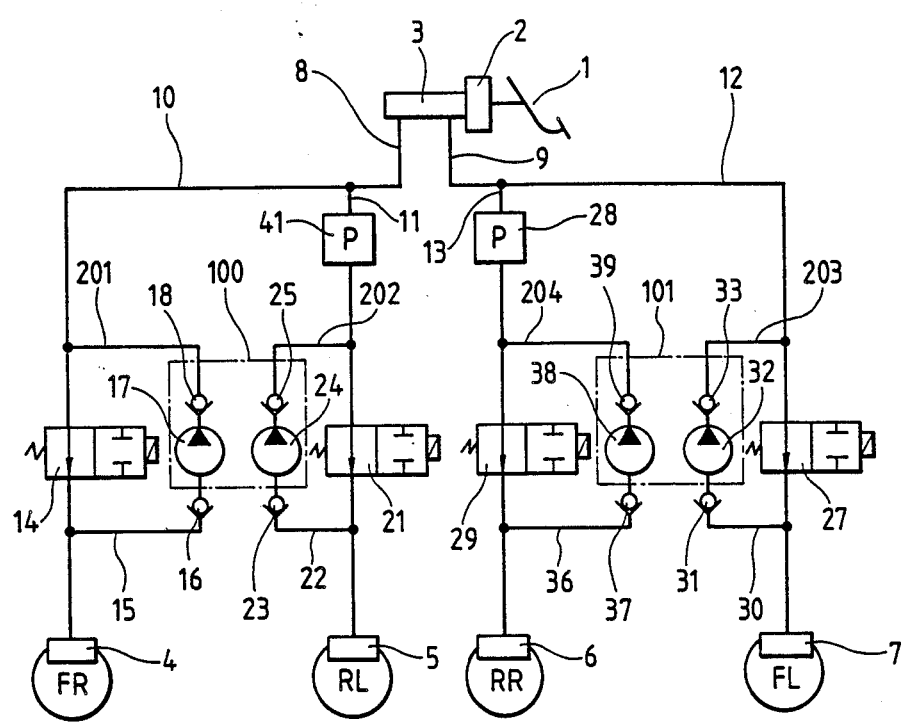
FIG. 4 is a circuit diagram of a hydraulic circuit of an anti-skid braking control system shown for comparison.

FIG. 4 shows a comparative anti-skid braking control system in which the output ports of pumps 24, 38 are connected to the respective braking systems for the rear wheels RL, RR. This anti-skid braking control system suffers the following problem:

The pumps 24, 38 coupled to the rear wheel cylinders 5, 6 discharge oil through respective passages 202, 204 to the portions of the branch pipes 11, 13 which are disposed downstream of the proportioning valves 41, 28. The oil pressures downstream of the proportioning valves 41, 28 are regulated so as to be lower than the oil pressure in the master cylinder 3. When the pumps 24, 28 discharge braking oil to the downstream sides of the proportioning valves 41, 28, the oil pressures downstream of the proportioning valves 41, 28 are increased to the extent that the braking oil flows back into the proportioning valves 41, 28. As a result, the proportioning valves 41, 28 may be damaged or their durability may be reduced.

According to the first embodiment of the invention as shown in FIGS. 1 through 3, the output ports of the pumps 17, 24 are connected to the front wheel braking system which has no proportioning valve, and hence the anti-skid braking control system is free from the above drawback described above with reference to FIG. 4.

Figure 5:
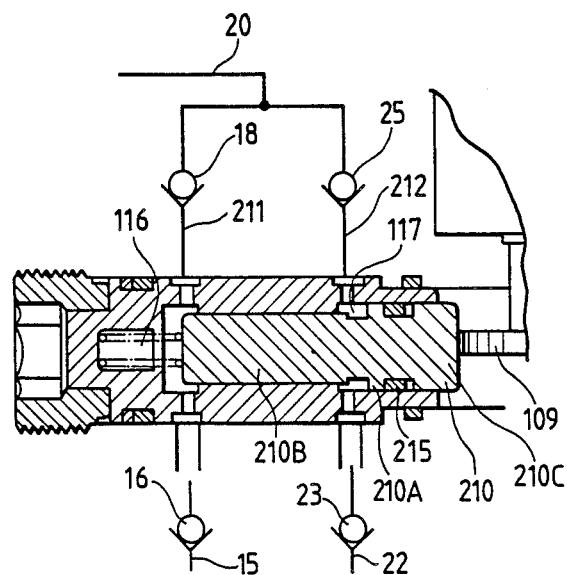
FIG. 5 is a cross-sectional view showing a portion of a pump assembly according to a second embodiment of the present invention.

A pump assembly according to a second embodiment of the present invention will be described with reference to FIG. 5.

According to the second embodiment, check valves 18, 25 are disposed in respective passages outside of a pump assembly, and the pump assembly has a plunger 210 of a simple structure. The other details of the second embodiment are identical to those of the first embodiment and are not be described in detail. The plunger 210 has a step 210A dividing the plunger 210 into a smaller-diameter portion 210B and a larger-diameter portion 210C. The plunger 210 is slidably disposed in a pump housing with a seal member 215 disposed around the plunger 210.

Figure 6:
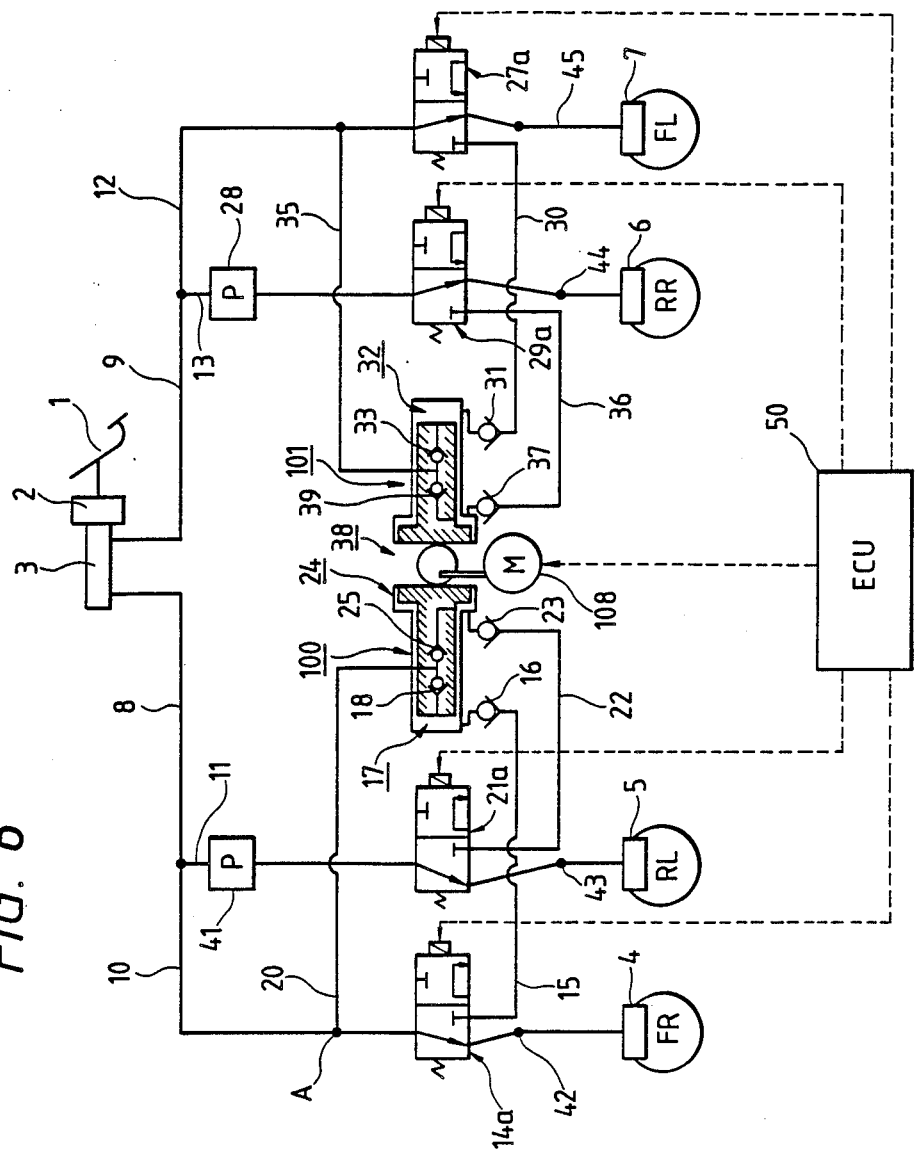
FIG. 6 is a schematic diagram of an anti-skid braking control system according to a third embodiment of the present invention.

FIG. 6 shows an anti-skid braking control system according to a third embodiment of the present invention. The third embodiment differs from the first embodiment in that each of solenoid-operated valves 14a, 21a, 27a, 29a comprises a three-port two-position valve.

Since the on-off valves 14a, 21a, 27a, 29a are identical to each other, only the on-off valve 14a will be described below. The on-off valve 14a, when in an illustrated first position, provides fluid communication between branch pipes 10, 42, and, when in a second position, disconnects the branch pipe 42 from the branch pipe 10 and connects the branch pipe 42 to the branch pipe 15. When the on-off valve 14a is in the first position, the pipe 15 is disconnected from the pipe 42. Therefore, in the normal braking mode, the braking oil pressure from the wheel cylinders is not applied to the pumps 17, 24, 32, 38, which are therefore rendered highly durable.

Figure 7:
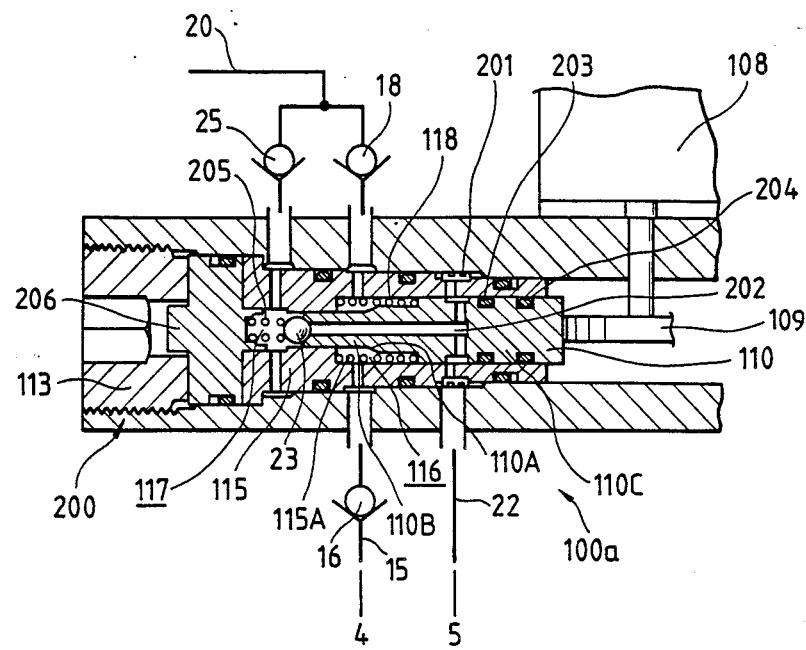
FIG. 7 is a cross-sectional view showing a portion of a pump assembly according to a fourth embodiment of the present invention.

FIG. 7 shows a pump assembly according to a fourth embodiment of the present invention. A pump assembly, generally denoted at 100a, is combined with another pump assembly (not shown in FIG. 7) and operatively coupled therewith through the eccentric cam 109. Inasmuch as these pump assemblies are identical to each other, only the illustrated pump assembly 100a will be described below.

The pump assembly 100a has a cylinder 115 slidably disposed in a housing 200 and having a step 115A of a larger inside diameter. A plunger 110 slidably disposed in the cylinder 115 has a smaller-diameter portion 110B and a larger-diameter portion 110C, and also includes a step 110A on the smaller-diameter portion 110B. A pressure varying chamber 116 is defined between the steps 115A, 110A, whereas a pressure varying chamber 117 is defined between the smaller-diameter portion of the cylinder 115 and the smaller-diameter portion 110B of the plunger 110. The pressure varying chamber 116 is disposed between the check valve 16 in the branch pipe 15 communicating with the front wheel cylinder 4 and the check valve 18 connected to the branch pipe 20. The pressure varying chamber 117 communicates with the branch pipe 22 connected to the rear wheel cylinder 5 through passages defined in the housing 200 and the cylinder 115, an oil chamber 202 defined in the plunger 110, and a check valve 23. A cylindrical filter 201 is disposed around the cylinder 115 between the passages defined in the housing 200 and the cylinder 115 and interconnecting the branch pipe 22 and the oil chamber 202.

The oil chamber 202 and the pressure varying chamber 116 are separated from each other by a small gap around the outer sliding surface of the plunger 110. The righthand end (closer to the motor 108) of the oil chamber 202 is also separated from the ambient space by two seals 203, 204 disposed around the plunger 110. Since the oil chamber 202 is thus isolated from the ambient air through a double-seal structure, the oil chamber 202 is rendered highly durable and reliable. A spring 118 is disposed in the pressure varying chamber 116 for normally urging the plunger 110 toward the eccentric cam 109 with respect to the cylinder 115. A spring 205 normally biases the check valve 23 to prevent oil from flowing back from the pressure varying chamber into the oil chamber 202.

A cylinder holder 206 is disposed in the housing 200 and sandwiched between the cylinder 115 and the screw 113. The cylinder holder 206 also cooperates with the cylinder 115 and the plunger 110 in defining the pressure varying chamber 117 and doubles as a seat for the spring 205. The pressure varying chamber 117 communicates with the branch pipe 20 through passages defined in the cylinder 115 and the housing 200 and the check valve 25. Oil from the pressure varying chamber 116 and oil from the pressure varying chamber 117 are combined when they enter the branch pipe 20.

The pump assembly 100a will operate as follows: When the motor 108 is energized to rotate the eccentric cam 109, the plunger 110 is reciprocally moved in axial directions by the eccentric cam 109. When the plunger 110 is moved to the right in FIG. 7, it operates in a suction stroke to increase the volumes of the pressure varying chambers 116, 117 in proportion to the stroke of the plunger 110, allowing oil to flow into the pressure varying chambers 116, 117 from the check valves 16, 23. Upon movement of the plunger 110 in the leftward direction, it operates in a discharge stroke to discharge oil from the pressure varying chambers 116, 117 under pressure through the check valves 18, 25. Theoretically, the displacement of the pressure varying chamber 117 is represented by the product of the plunge stoke and the cross-sectional area of the smaller-diameter portion 110B, whereas the displacement of the pressure varying chamber 116 is represented by the product of the piston stroke and the effective cross-sectional area of the plunger 110 (the difference between the cross-sectional areas of the larger- and smaller-diameter portions 110C, 110B). In the embodiment shown in FIG. 7, the theoretical displacement of the pressure varying chamber 116 is 1 cc/rev., while the theoretical displacement of the pressure varying chamber 117 is 0.5 cc/rev. Since the check valve 23 is positioned in the pressure varying chamber 117, the seals 203, 204 are only subjected to the oil pressure drawn into the pump assembly 110a. As also shown in FIGS. 1, 2, and 6, the pressure varying chamber 117 of the pump 24 is supplied with braking oil from the rear wheel cylinder which is usually under lower oil pressure. Therefore, the seals associated with the pressure varying chamber 117 are highly durable.

Figure 8:
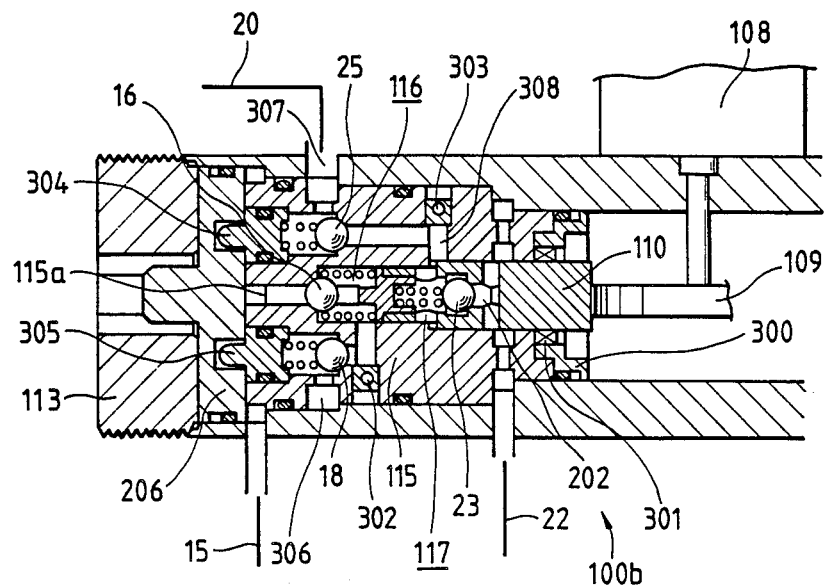
FIG. 8 is a cross-sectional view showing a portion of a pump assembly according to a fifth embodiment of the present invention.

FIG. 8 shows a pump assembly 100b according to a fourth embodiment of the present invention. In the fourth embodiment, check valves 16, 18, 23 are disposed in a cylinder 115 to make the pump assembly compact and higher in pumping efficiency. Those parts of FIG. 8 which are functionally identical to those of FIG. 7 are designated by identical reference numerals, and will not be described in detail. A seal ring 301 is fixed to a pump assembly housing by a fixing ring 300. Plugs 302, 303 are placed in the cylinder 115 to close certain passages defined therein. The springs of the check valves 16, 18 are received by respective spring seats 304, 305 securely mounted in the cylinder 115.

In operation, when the eccentric cam 109 is rotated to move the plunger 110 back and forth, the pressure varying chambers 116, 117 repeat their suction and discharge strokes. In the suction stroke, the pressure varying chamber 116 draws braking oil pressure from a front Wheel Cylinder via the pipe 15 and a central oil passage 115a defined in the cylinder 115, the pipe 15 and the oil passage 115a communicating with each other through a non-illustrated passage defined in the lefthand end surface of the cylinder 115. In the discharge stroke, the pressure varying chamber 116 discharges the drawn braking oil under pressure via the check valve 18, an annular oil passage 306 defined in the cylinder 115, and an outlet port 307 into the pipe 20. The other pressure varying chamber 117 draws in braking oil via the pipe 22, the oil chamber 202, and the check valve 23 in the suction stroke, and discharges the braking oil under pressure via an oil passage 308 defined in the cylinder 115, the check valve 25, the annular oil passage 306, and the outlet port 307 into the pipe 20 in the discharge stroke.

Although certain preferred embodiments have been shown and described, it should be understoodthat many changes and modifications may be made therein without departing from the scope of the appended claims.

What is claimed is:

1. An anti-skid braking control system for use on a motor vehicle having first and second wheels, comprising:
   a master cylinder;
   first and second wheel cylinders for braking the first and second wheels, respectively, with a braking medium pressure transmitted from said master cylinder;
   first and second solenoid-operated valves disposed in pipes interconnecting said master cylinder and said first and second wheel cylinders, respectively, for selectively providing communication between said master cylinder and said first and second wheel cylinders through said pipes;
   first and second pumps connected to said pipes, respectively, for delivering a braking medium from downstream portions of said pipes which are disposed downstream of said first and second solenoid-operated valves with respect to the direction in which the braking medium pressure is transmitted from said master cylinder to said first and second wheel cylinders, to upstream portions of said pipes which are disposed upstream of said first and second solenoid-operated valves with respect to said direction; and
   said first and second pumps comprising a common housing, a common plunger slidably disposed in said common housing and reciprocally movable therein, and first and second pressure varying chambers defined by said plunger independently of each other and having respective volumes variable in response to reciprocating movement of said common plunger, said first and second pressure varying chambers having inlet ports, respectively, connected directly to said downstream portions of said pipes.

2. An anti-skid braking control system according to claim 1, wherein said plunger has an axial step defining said first pressure varying chamber therearound, said first and second pumps further including a common cylinder disposed in said housing, said plunger and said cylinder defining said second pressure varying chamber therebetween.

3. An anti-skid braking control system according to claim 1, wherein each of said first and second solenoidoperated valves comprises three-port two-position on-off valve, said on-off valve having a first port connected to the upstream portion of one of said pipes, a second port connected to the downstream portion of said one of the pipes, and a third port connected to one of said first and second pumps.

4. An anti-skid braking control system according to claim 1, further including a first check valve disposed outside of said common housing and connected between said first wheel cylinder and said first pump for allowing the braking medium to flow only from said first wheel cylinder to said first pump, a second check valve disposed outside of said common housing and connected between said second wheel cylinder and said second pump for allowing the braking medium to flow only from said second wheel cylinder to said second pump, a third check valve disposed outside of said common housing and connected between said first pump and one of said upstream portions of the pipes for allowing the braking medium to flow only from said first pump to said one upstream portion, and a fourth check valve disposed outside of said common housing and connected between said second pump and said one upstream portion for allowing the braking medium to flow only from said second pump to said one upstream portion.

5. An anti-skid braking control system according to claim 1, further including a first check valve disposed within said common housing and connected between said first wheel cylinder and said first pump for allowing the braking medium to flow only from said first wheel cylinder to said first pump, a second check valve disposed within said common housing and connected between said second wheel cylinder and said second pump for allowing the braking medium to flow only from said second wheel cylinder to said second pump, a third check valve disposed within said common housing and connected between said first pump and one of said upstream portions of the pipes for allowing the braking medium to flow only from said first pump to said one upstream portion, and a fourth check valve disposed within said common housing and connected between said second pump and said one upstream portion for allowing the braking medium to flow only from said second pump to said one upstream portion.

6. An anti-skid braking control system according to claim 1, wherein said first and second wheel cylinders are disposed on a diagonal line on the motor vehicle, said first and second pressure varying chambers being connected to said first and second wheel cylinders, respectively.

7. An anti-skid braking control system for use on a motor vehicle having four wheels, comprising:
   a master cylinder;
   four wheel cylinders for braking the four wheels, respectively, with a braking medium pressure transmitted from said master cylinder;
   four solenoid-operated valves disposed in pipes interconnecting said master cylinder and said wheel cylinders, respectively, for selectively providing communication between said master cylinder and said wheel cylinders through said pipes;

four pumps connected to said pipes, respectively, for delivering a braking medium from downstream portions of said pipes which are disposed downstream of said solenoid-operated valves with respect to the direction in which the braking medium pressure is transmitted from said master cylinder to said wheel cylinders, to upstream portions of said pipes which are disposed upstream of said solenoid-operated valves with respect to said direction; and said four pumps comprising a common housing, first and second common plungers slidably disposed in said common housing, and reciprocally movable therein, first and second pressure varying chambers defined by said first common plunger independently of each other and having respective volumes variable in response to reciprocating movement of said first common plunger, and third and fourth pressure varying chambers defined by said second common plunger independently of each other and having respective volumes variable in response to reciprocating movement of said second common plunger, said pressure varying chambers having inlet ports, respectively, connected directly to said downstream portions of said pipes; and actuator means for reciprocally moving said common plungers.

8. An anti-skid braking control system according to claim 7, wherein said actuator means comprises an electric motor having an output shaft and an eccentric cam mounted on said output shaft.

9. An anti-skid braking control system according to claim 8, wherein said first and second common plungers are disposed in confronting relation in slidable contact with said eccentric cam.

10. An anti-skid braking control system according to claim 7, wherein said four wheels include front righthand and rear lefthand wheels disposed on a diagonal line on the motor vehicle and front lefthand and rear righthand wheels disposed on another diagonal line on the motor vehicle, said first and second pressure varying chambers being connected to the wheel cylinders for braking said front righthand and rear lefthand wheels, respectively, and said third and fourth pressure varying chambers being connected to the wheel cylinders for braking said front lefthand and rear righthand wheels, respectively.

11. An anti-skid braking control system for use on a motor vehicle having four wheels associated with respective wheel speed sensors, comprising:

four wheel cylinders for braking said four wheels, respectively;

four solenoid-operated valves for selectively applying braking fluid pressures respectively to said four wheel cylinders;

an electric motor;

pump means actuatable by said electric motor for independently reducing braking fluid pressures in said wheel cylinders, respectively;

said pump means comprising two plungers reciprocally movable by said electric motor, and two pairs of pressure varying chambers defined by said two plungers, respectively, and having respective volumes independently variable by said two plungers, said pressure varying chambers being connected directly to said wheel cylinders, respectively, without any reservoir therebetween; and control means for detecting an incipient wheel lockup condition based on a signal from said wheel speed sensors and for controlling said solenoid-operated valves and said pump means to reduce the braking fluid pressure in the wheel cylinder associated with the wheel which is subjected to the detected incipient wheel lockup condition.

12. An anti-skid braking control system according to claim 11, wherein said four wheels include front righthand and rear lefthand wheels disposed on a diagonal line on the motor vehicle and front lefthand and rear righthand wheels disposed on another diagonal line on the motor vehicle, one of said two pairs of pressure varying chambers being connected to the wheel cylinders for braking said front righthand and rear lefthand wheels, respectively, and the other of said two pairs of pressure varying chambers being connected to the wheel cylinders for braking said front lefthand and rear righthand wheels, respectively.

* * * * *

UNITED STATES PATENT AND TRADEMARK OFFICE
CERTIFICATE OF CORRECTION

PATENT NO. : 4,875,741

DATED : October 24, 1989

INVENTOR(S) : OZAWA, Takashi et al

It is certified that error appears in the above-identified patent and that said Letters Patent is hereby corrected as shown below:

Title Page

[30] FOREIGN APPLICATION PRIORITY DATA should include the following:

```
    Feb. 2, 1988  [JP]  Japan ......... 63-23304
 -- Dec. 21, 1988 [JP]  Japan ......... 63-322872  --.
```

Signed and Sealed this

Nineteenth Day of May, 1992

Attest:

DOUGLAS B. COMER

Attesting Officer

Acting Commissioner of Patents and Trademarks